No. 682,395. Patented Sept. 10, 1901.
E. L. WAGNER.
PULLEY.
(Application filed Nov. 27, 1900.)
(No Model.) 3 Sheets—Sheet 1.

WITNESSES
INVENTOR
EMIL L. WAGNER
BY Paul H Hawly
HIS ATTORNEYS.

THE NORRIS PETERS CO., PHOTO-LITHO., WASHINGTON, D. C.

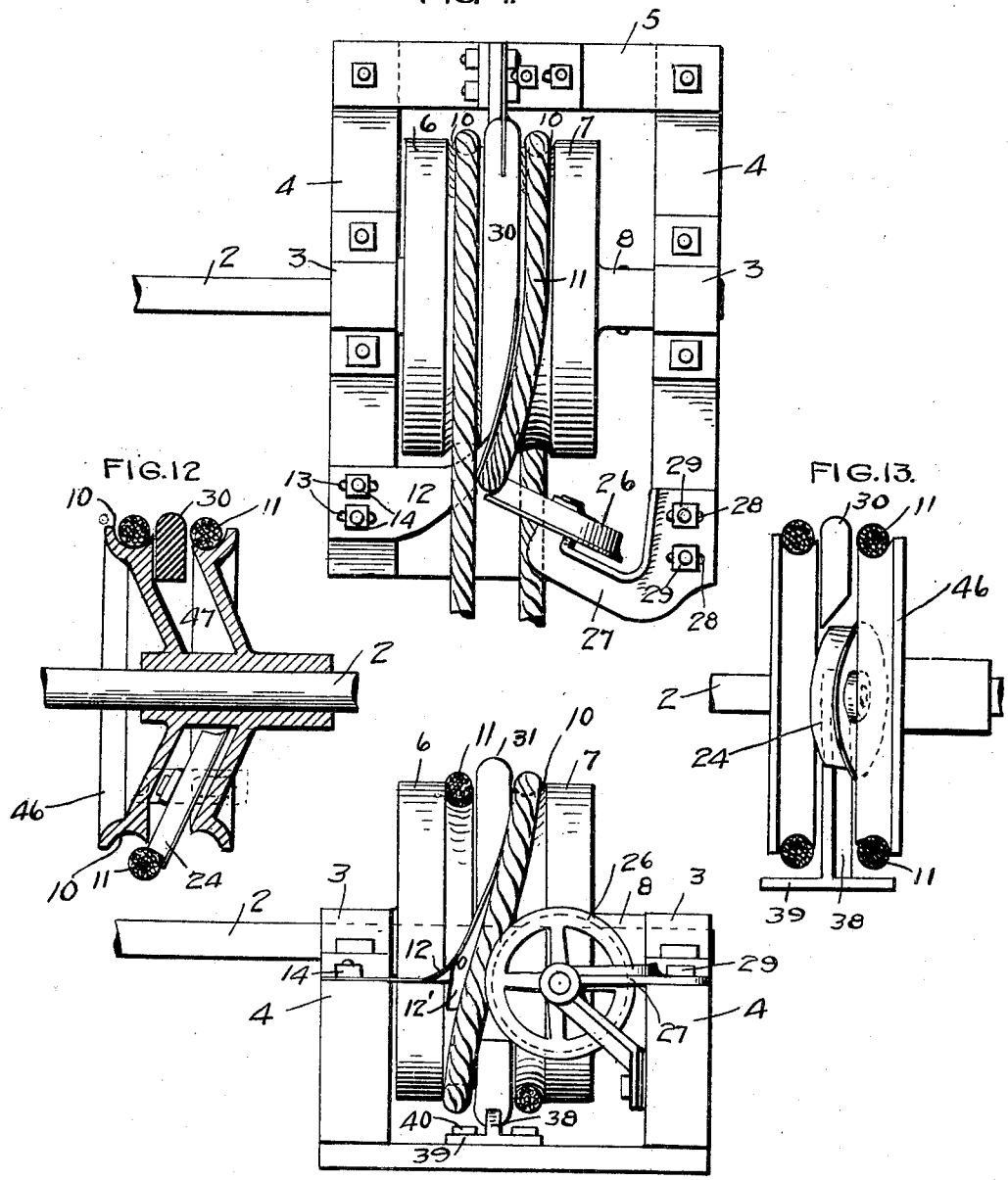

No. 682,395. Patented Sept. 10, 1901.
E. L. WAGNER.
PULLEY.
(Application filed Nov. 27, 1900.)
(No Model.) 3 Sheets—Sheet 3.
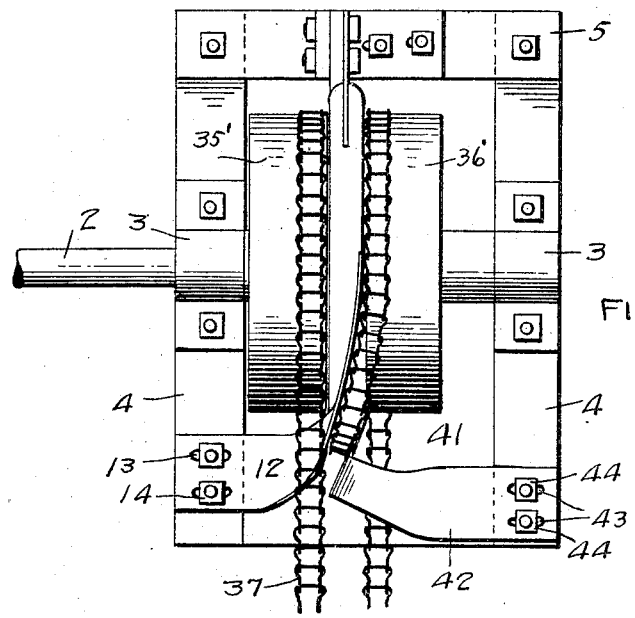
FIG. 6.
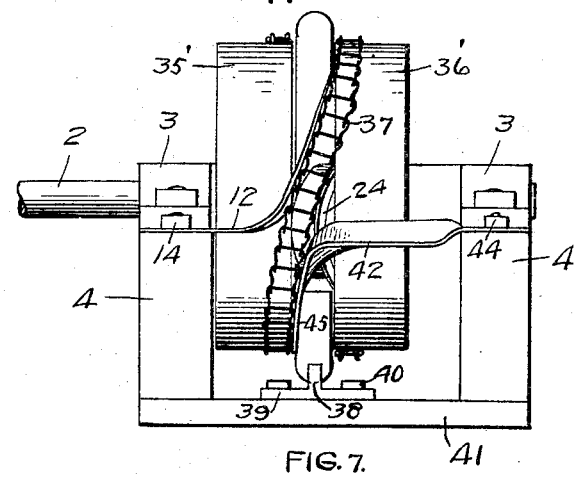
FIG. 11.
FIG. 7.
FIG. 10
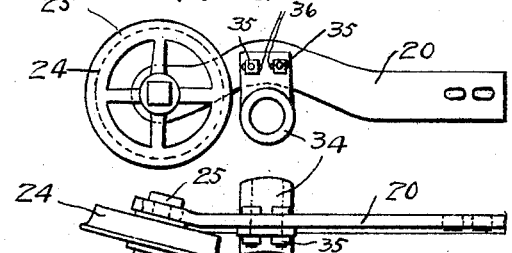
FIG. 8.
FIG. 9.
WITNESSES
INVENTOR
EMIL L. WAGNER
BY Paul & Hawley
HIS ATTORNEYS.

UNITED STATES PATENT OFFICE.

EMIL L. WAGNER, OF ABERDEEN, SOUTH DAKOTA.

PULLEY.

SPECIFICATION forming part of Letters Patent No. 682,395, dated September 10, 1901.

Application filed November 27, 1900. Serial No. 37,874. (No model.)

*To all whom it may concern:*

Be it known that I, EMIL L. WAGNER, of Aberdeen, Brown county, South Dakota, have invented certain new and useful Improvements in Pulleys, of which the following is a specification.

My invention relates to pulleys for use with endless ropes, cables, chains, or round belts for transmitting power from place to place or in connection with hoisting or elevating devices.

The invention is designed especially as an improvement over some of the features shown and described in Letters Patent of the United States Nos. 630,760 and 660,783, granted to me August 8, 1899, and October 30, 1900.

The object of the invention is to simplify and cheapen the construction of the pulley by providing improved antifriction means over which the rope, chain, or cable passes from one side of the pulley to the other.

A further object is to adapt the pulley for use with any suitable style of chain that may be used for transmitting power or for hoisting purposes.

The invention consists generally in providing an antifriction wheel or roller in the periphery of the pulley with its axis at an angle to the axis of the pulley.

Further, the invention consists in providing a fixed guide or guard for use on the pulley when a chain is employed.

Further, the invention consists in various constructions and combinations, all as hereinafter described, and particularly pointed out in the claims.

Figure 1:
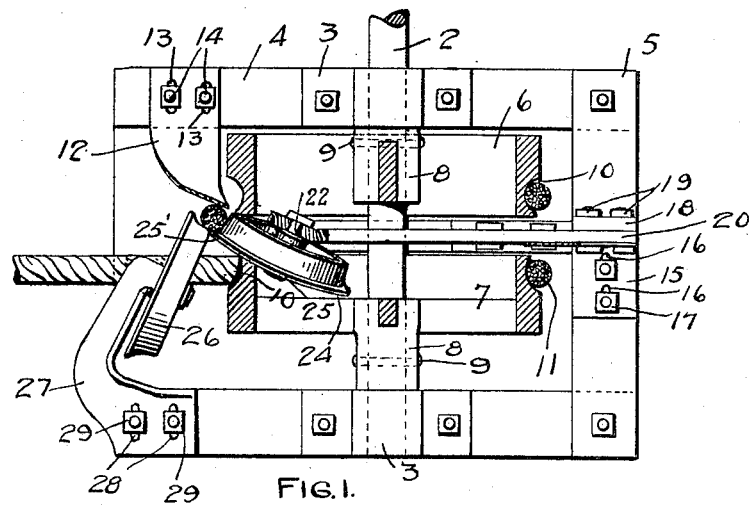
Figure 2:
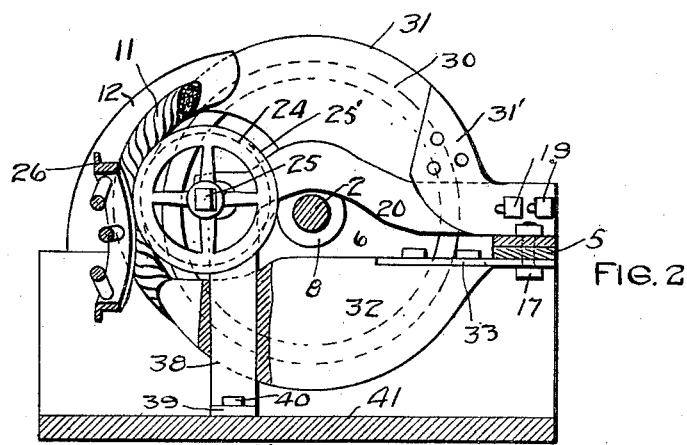
Figure 3:
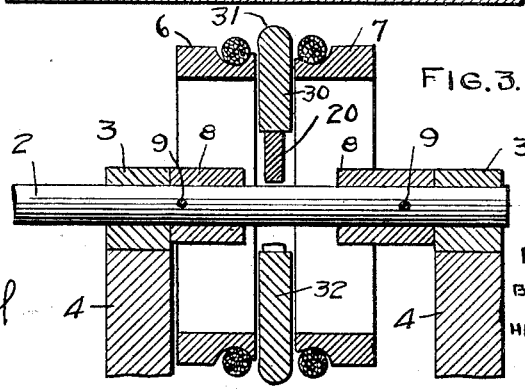

In the accompanying drawings, forming part of this specification, Figure 1 is a horizontal section of a pulley embodying my invention. Fig. 2 is a vertical section of the same. Fig. 3 is a vertical section. Fig. 4 is a plan view showing the pulley in use with a rope. Fig. 5 is a front view of the same. Fig. 6 is a plan view showing a flat-faced pulley adapted for use with a chain. Fig. 7 is a front view. Fig. 8 is a side view showing the support for the roller or wheel arranged in the periphery of the pulley. Fig. 9 is a top view of the same. Figs. 10 and 11 are details of preferred form of chain for use on the pulley. Fig. 12 is a sectional view showing the modified construction of the pulley. Fig. 13 is a front view of the same.

In the drawings, 2 represents a shaft; 3, the bearings therefor, mounted upon a suitable frame 4, that is provided at the rear of the pulley with a cross-bar 5. The pulley may be mounted in any suitable manner on the frame of the separator or other mechanism on which the pulley is used; but for convenience of illustration I have employed the supporting means shown in the drawings.

In constructing a pulley in accordance with the drawings of my former patents I have found that the antifriction devices arranged in the peripheral face of the pulley added considerably to the expense of building the same, and I have therefore aimed in this invention to simplify the construction of the device and provide a less expensive means that will, without unnecessary friction or wear on the rope, permit it to pass from one side of the pulley to the other. With this end in view I have divided the pulley vertically into two annular sections or members 6 and 7, having hubs 8, that are secured upon the shaft 2 at a suitable distance apart by means of pins 9 or in any other suitable way, so that a space is provided between the two members. Each of the sections of the pulley is preferably provided in its face with an annular groove 10 to receive the rope, cable, chain, or round belt that may be used on the pulley.

11 represents a section of an endless rope that is looped or wrapped around the sections of the pulley and passes from thence to a traction-engine or other suitable source of power.

As set forth in my former applications, when the rope or cable is looped around the pulley it is necessary to provide some means to prevent it from passing off the end of the pulley during its revolution. I therefore provide a guide-plate 12, having slots 13 in one end, adjustably secured on the frame 4 by bolts 14. The opposite end of said plate is curved upwardly and extends over the face of the adjoining section of the pulley and acts as a guide to direct the rope from the section 6 over the space between the sections to the groove in the section 7. As shown in Fig. 5, I may provide a depending wing 12' on the plate 12 to aid in guiding the rope across when it is reversed.

On the cross-bar 5 I prefer to provide a plate 15, having slots 16 to receive bolts 17, by means of which said plate is rendered horizontally adjustable, and the upwardly-turned inner end 18 of said plate is preferably secured by bolts 19 to a bar 20, that extends horizontally between the sections 6 and 7 and is preferably provided near its inner end with a bend or turn and a socket 22, wherein a stud or axis 25 of an antifriction wheel or roller 24 is adjustably supported. The bend or turn in the bar 20 causes the axis of said wheel to stand at an angle to the axis of the pulley and the face of the wheel to occupy a diagonal position within the face of the pulley. The bar being adjustable on its support may be moved in or out to adjust the wheel with respect to the face of the pulley. A flange 25' is preferably provided on one side of the wheel to prevent the rope from accidentally slipping off the same while passing from one section or member of the pulley to the other, and to prevent the rope or cable from running off the pulley when running forward I prefer to provide a flanged wheel 26, supported on a bracket 27, having slots 28, through which bolts 29 pass to secure said brackets on the frame 4. The wheel 26 is thus rendered adjustable and may be moved toward or from the wheel 24 to adapt the device for use with ropes or cables of different size and adjust it in proper position to prevent the rope from leaving the wheel 24 and insure its being directed into the groove in the member 6 when traveling forward. As the pulley revolves the rope or cable will travel in the grooves of the members thereof and from one member to another, and as said grooves are comparatively shallow I have found it desirable to provide some means for filling, substantially, the space between the peripheral faces of the members to prevent the rope or cable from accidentally slipping in between them. This means consists, preferably, of a curved member 30, of wood or other suitable material, having, preferably, a rounded edge 31, projecting above the face of the pulley and secured by bolts or other suitable means to a plate 31', that is adjustably supported on the bolts 19. The forward end of the member 30 is cut away on the under side to accommodate the antifriction-wheel 24 and engages the upwardly-curved end of the plate 12, and the lower edge of said member rests upon the top of the bar 20 and is firmly supported thereby. The space above the pulley-shaft is thus guarded and the rope prevented from slipping in between the sections of the pulley. Below the shaft I prefer to provide a second member 32, also preferably of wood, provided, preferably, with a bar 33, that is adjustably secured to the under side of the bar 5 by any suitable means, preferably by the bolts 17. The plate 32 substantially fills the space between the sections of the pulley below its shaft and presents a curved rounded edge that extends below the face of the pulley a distance corresponding to the extension of the members 30 above the shaft and effectually prevents the rope or cable from working into the space between the two sections forming the lower portion of the pulley.

The sections or segments 30 and 32 may be modified considerably in form, may be made of any suitable material, and may be secured in any preferred way to the frame upon which the pulley-shaft is supported or to the bar 20.

The inner edges of the grooves 10 in the faces of the sections of the pulley are cut away, as will be noted in Fig. 1, to facilitate the passage of the rope or cable from the grooves to the guiding antifriction-wheel 24.

As clearly shown in Figs. 8 and 9, I may prefer to provide a hub 34 on the shaft 2, between the sections of the pulley, and adjustably secure the same to the bar or plate 20 by means of bolts 35, passing through slots 36. A firm substantial support is thus provided for the plate 20 and the guiding-wheel carried thereby.

In Fig. 6 I have shown a modified construction, which consists in providing a pulley divided vertically, as before, into two annular sections or members 35' and 36', having flat peripheral faces and adapted particularly for use with a chain 37, having substantially flat links, as shown in Figs. 6 and 11.

In Figs. 5 and 7 I have shown the guiding-wheel 24 supported on an upright standard 38, having feet 39 adjustably secured by bolts 40 to a base 41, provided beneath the pulley.

Instead of using the chain having flat links I may employ the style shown in Fig. 10, usually known as "twisted links," and when either of these styles of chain or any other is employed I prefer to remove the guard-wheel 26 and substitute therefor a plate 42, having slots 43, through which bolts 44 pass to secure the plate to the frame 4 and permit its horizontal adjustment. At its inner end the plate 42 is provided with a downwardly-curved portion 45, that is adapted to engage the chain and prevent it from running off the pulley when running forward.

In Figs. 12 and 13 I have shown still another modification of the pulley, which consists in providing a narrow-faced pulley 46 with an annular diagonal slot or groove 47. Instead of dividing the same into two independent sections or members on each side of the slot I prefer to provide annular grooves in the face of the pulley, and within the slot above and below the pulley-shaft I arrange the guard blocks or plates 30 and 32, as heretofore described, and within said slot, with its axis at an angle to the axis of the pulley, I provide the antifriction-roller supported on the upright standard described with reference to Fig. 7. This form of pulley has only one hub on the shaft and comprises but one comparatively narrow-faced instead of two wide-faced members, but in other respects corresponds to the construction shown in Fig. 1.

The pulleys shown in Figs. 4, 5, and 12 have the grooved faces similar to those shown in Figs. 1 and 2; but it will be understood that they may be made with flat faces, if preferred. It will also be understood that all the forms of pulleys described may be adapted for use with a chain of any suitable construction and size and that any other preferred means than the one employed may be adopted for supporting the antifriction guide-wheel and the guard-plates therein.

The pulley is adapted for use wherever it is desired to transmit power by means of an endless rope, cable, chain, or round belt, and while primarily designed for use in the transmission of power from a traction-engine to the separator of a threshing-machine it may nevertheless be used with various kinds of hoisting or elevating devices.

I have shown the rope or chain wrapped once and a half times around the pulley; but for hoists and elevators I may prefer to make a single turn or a turn and a quarter. As the pulley can be driven forward or backward, it is not necessary that the rope or chain be endless. The endless form of rope or chain is used in transmitting power from a driving-pulley to a driven pulley; but where the device is employed in a hoisting or elevating apparatus or similar devices the flexible elevating means used with the pulley need not be endless. In several figures of the drawings I have shown a wide-faced pulley, much wider than is necessary for the rope, chain, or cable to run on. In Figs. 12 and 13, however, I have shown a pulley having a face wherein each section corresponds substantially in width to that of the groove therein. It will be understood that a pulley having any desired width of face may be employed and either with or without grooves in its periphery, as preferred. If a chain is to be employed in connection with the pulley, I may prefer to dispense with the grooves in the face.

In the use of this device I do not wish to be confined to the number of times the rope, chain, or cable is wrapped around the face of the pulley, as the number of loops may be increased or decreased according to the work to be performed or the preference of the operator.

In practice I shall prefer to employ castings for the guards in front of the pulley, and these may be braced and strengthened by suitable ribs. Any other suitable means than I have shown may be employed for supporting the wall within the pulley, and various modifications may be devised of the guard-plates between the sections of the pulley and the manner of supporting them, and in many ways the details of construction may be modified by any one skilled in the art without departing from my invention.

Having thus described my invention, I claim as new and desire to secure by Letters Patent—

1. The combination, with a pulley, of an endless rope or cable having a loop or wrap around the peripheral face of the pulley, means for engaging said loop to direct it across the face of the pulley as it revolves, and an antifriction wheel or roller provided in the periphery of the pulley and having its axis at an angle to the axis of the pulley, for the purpose specified.

2. The combination, with a pulley, of an endless rope or cable engaging said loop or wrap around the face of the pulley, means engaging said loop to direct it across the face of the pulley as it revolves, and an adjustable antifriction wheel or roller provided in the periphery of the pulley and having its axis at an angle to the axis of the pulley, for the purpose specified.

3. The combination, with a pulley, of an endless rope or cable having a loop or wrap about the peripheral face of the pulley, adjustable means engaging said loop to direct it across the face of the pulley as it revolves, and an antifriction wheel or roller provided within the periphery of said pulley and having its axis at an angle to the axis of said pulley, for the purpose specified.

4. The combination, with a pulley, of an endless rope or cable having a loop or wrap about the peripheral face of the pulley, an antifriction wheel or roller provided within the periphery of the pulley and having its axis at an angle to the axis of said pulley and adapted to direct the rope or cable from one side of the pulley to the other, and a suitable guide or guard wheel provided near said antifriction-wheel to prevent the rope from running off the same when the pulley is running forward, substantially as described.

5. The combination, with a pulley, of a rope or chain looped about the peripheral face of the same, means for directing the rope from one side of the pulley to the other, and an antifriction wheel or roller supported within the periphery of the pulley, and having its axis at an angle to the axis of the pulley, and projecting beyond the face of the same to engage the rope as it passes from one side of the pulley to the other, substantially as described.

6. The combination, with a pulley divided vertically into two annular sections or members, of a shaft whereon said members are mounted with a space between them, an endless rope or cable looped or wrapped about the peripheral face of said members, means engaging the rope to direct it from one member to the other, a suitable guard provided within the space between said members, and an antifriction wheel or roller also provided within said space and over which the rope passes from one member to the other, substantially as described.

7. The combination, with a pulley divided vertically into two annular sections or members, of a shaft whereon said members are secured with a space between them, a rope or cable looped or wrapped about the peripheral face of said members, means engaging said loop to direct it across said space from one member to the other as the pulley revolves, a suitable guard coacting with said directing means, an antifriction wheel or roller provided between said members and having its axis at an angle to said shaft and projecting beyond the peripheries of said members to engage the rope as it passes from one to the other, and a suitable guard to prevent the rope from leaving said antifriction-wheel when the pulley is reversed, substantially as described.

8. The combination, with a pulley, divided vertically into two annular sections or members, of a shaft whereon said members are mounted with a space between them, a rope or cable looped or wrapped around the peripheries of said members, an adjustable plate engaging said rope to direct it from one member to the other, a guard coacting therewith, an antifriction wheel or roller provided between said members, and projecting outside the peripheries of the same to engage the rope as it passes from one member to the other, and a suitable standard or support whereon said wheel is pivoted, substantially as described.

9. The combination, with a pulley, of a rope or cable looped or wrapped about the peripheral face of the pulley, means engaging the rope, cable or chain to direct it across the face of the pulley as it revolves, and an antifriction wheel or roller provided in the periphery of the pulley and having its axis at an angle to the axis of said pulley, whereby its direction of rotation will be diagonally across the face of the pulley, for the purpose specified.

10. The combination, with a pulley, of a rope or cable looped or wrapped about its peripheral face, means engaging the rope to direct it across the face of the pulley as it revolves, and an adjustable antifriction device provided within the periphery of the pulley on which the rope travels from one side to the other, for the purpose specified.

11. The combination, with a pulley, of flexible power-transmitting means looped or wrapped about the peripheral face of the pulley, means engaging said power-transmitting means to direct it across the face of the pulley as it revolves, and a wheel or roller provided in the periphery of the pulley, the direction of rotation of said wheel being diagonally with respect to the face of the pulley, for the purpose specified.

12. A pulley, in combination with flexible power-transmitting means looped or wrapped about its peripheral face, and an antifriction device on the periphery of the pulley, the direction of movement of said antifriction device on its axis being diagonally with respect to the face of the pulley, for the purpose specified.

13. A pulley having annular grooves in its face, in combination with flexible power-transmitting means looped or wrapped about the same, and an antifriction device provided in the periphery of the pulley, and rotating in a direction diagonally with respect to the face of the same, for the purpose specified.

14. A pulley, in combination with flexible power-transmitting means looped or wrapped about its face, and a flanged wheel or roller provided on said pulley, the direction of its rotation being diagonally with respect to the face of said pulley, for the purpose specified, In testimony whereof I have hereunto set my hand, this 16th day of November, 1900, at Aberdeen, South Dakota.

EMIL L. WAGNER.

In presence of—
C. H. SEELEY,
W. F. MASON.